US007584135B1

(12) United States Patent
McAllister et al.

(10) Patent No.: US 7,584,135 B1
(45) Date of Patent: Sep. 1, 2009

(54) SYSTEM AND METHOD FOR ELECTRONIC TRADING AND DELIVERY OF A COMMODITIZED PRODUCT

(75) Inventors: Charles Hadley McAllister, Wimberley, TX (US); Vivek Katyal, Austin, TX (US)

(73) Assignee: Bullion Direct, Inc., Austin, TX (US)

( * ) Notice: Subject to any disclaimer, the term of this patent is extended or adjusted under 35 U.S.C. 154(b) by 984 days.

(21) Appl. No.: 09/860,134

(22) Filed: May 17, 2001

Related U.S. Application Data

(60) Provisional application No. 60/204,650, filed on May 17, 2000.

(51) Int. Cl.
*G06Q 40/00* (2006.01)
(52) U.S. Cl. .............................. 705/37; 705/38; 705/36; 705/35
(58) Field of Classification Search ................. 382/139, 382/151; 705/35–38, 34; 704/354; 707/200; 235/472
See application file for complete search history.

(56) References Cited

U.S. PATENT DOCUMENTS

| | | | |
|---|---|---|---|
| 5,717,989 A | 2/1998 | Tozzoli et al. | |
| 5,794,210 A * | 8/1998 | Goldhaber et al. | ............ 705/14 |
| 5,826,241 A | 10/1998 | Stein et al. | |
| 5,913,202 A | 6/1999 | Motoyama | |
| 5,950,176 A | 9/1999 | Keiser et al. | |
| 5,963,923 A | 10/1999 | Garber | |
| 6,014,643 A * | 1/2000 | Minton | ..................... 705/36 R |
| 6,131,087 A | 10/2000 | Luke et al. | |
| 6,236,980 B1 * | 5/2001 | Reese | ....................... 705/36 R |
| 6,418,419 B1 * | 7/2002 | Nieboer et al. | ................ 705/37 |
| 6,760,470 B1 * | 7/2004 | Bogosian et al. | ............ 382/139 |
| 2003/0132298 A1 * | 7/2003 | Swartz et al. | .......... 235/472.02 |

OTHER PUBLICATIONS

Capobianco Named President of Prebon Commodities PR Newswire. New York: Mar. 4, 1998. p. 1.*
Bullion Direct, http://www.bulliondirect.com/aboutus.do, Jun. 7, 2007.

* cited by examiner

*Primary Examiner*—Frantzy Poinvil
*Assistant Examiner*—Clement Graham
(74) *Attorney, Agent, or Firm*—Dechert LLP

(57) ABSTRACT

The present invention provides a system and method for trading of a commoditized product through a distributed network of computers, and for delivering the commoditized products after the trade. The system includes an order matching routine, a payment routine, a product qualification routine, and a distribution routine. The invention provides for secure electronic trading of a commoditized product through a hub centric platform that provides for a real order exchange in a real time environment, allows individual buyers and sellers to remain anonymous to each other, eliminates size or volume as a means of discrimination for transaction, and maximizes distribution efficiency.

26 Claims, 21 Drawing Sheets

SYSTEM AND METHOD FOR ELECTRONIC TRADING AND DELIVERY OF A COMMODITIZED PRODUCT

CROSS-REFERENCE TO RELATED APPLICATIONS

This application claims the benefit under 35 U.S.C. §119(e) to provisional application No. 60/204,650, filed May 17, 2000.

TECHNICAL FIELD

This invention relates generally to the field of electronic trading and, more particularly, to providing secure electronic trading of a commoditized product through a hub centric platform that provides for a real order exchange in a real time environment, allows individual buyers and sellers to remain anonymous to each other, eliminates size or volume as a means of discrimination for transaction, qualifies products, and maximizes distribution efficiency.

BACKGROUND OF THE INVENTION

Establishing a buyer seller relationship is an essential step in commerce. The seller can attract buyers through advertising, direct solicitation, or through the sales activities of brokers and buyers. Currently, sellers can solicit buyers through traditional methods such as media advertising, and face to face selling, or they can utilize the relatively new technology of e-commerce by advertising on the Internet. Once interested buyers are attracted, transactions can proceed to closure in many ways.

Establishing a buyer seller relationship in traditional ways may result in a contract which then requires execution. The seller must provide the product, and the buyer must pay for the product. If the buyer and seller are in two different locations, a number of other issues are raised. For example, the credibility of each party, the authenticity and qualification of the product, the terms under which the buyer must take possession, the way in which the product will be shipped, who will pay for shipping and handling, and the mode of payment, all become major issues with which both parties must deal. Often buyers and sellers utilize a funding agent and establish a letter of credit for transfer of funds on products that must be shipped. This is costly and usually only available to sellers and buyers of substantial size, and for orders of significant volume. Carloads of grain may be sold in this manner, however, it would not be cost effective to use such a system for one gold coin.

Currently, buyers and sellers may use the Internet for establishing relationships. Current means for trading on the internet include order matching, catalogue sales, and auctions. Order matching is used most effectively for financial products, such as, for instance, stocks, bonds, and futures. These current systems may generate information or conduct a trade, however, the fulfillment of the transaction is purely electronic and doesn't involve the physical transfer of the item being traded. The price is tied to a limited access market, such as the New York Stock Exchange, or Chicago Board of Trade. These markets are market focused, not product focused. Price is determined based on the trades in the market.

In traditional order matching systems, end customers typically do not have access to true market pricing. The channels to view, place, and execute orders are tightly controlled by large players (i.e. institutions). Traditional commodities markets, such as the New York Mercantile Exchange (NYMEX), allow only limited access and are open only during certain times of the day. Actual commoditized products are not typically traded. Instead, large paper contracts for future delivery of bulk commodities are the focus of these markets. For example, a typical platinum contract is for future delivery of 50 ounces of platinum at a total value of approximately $30,000 each. These contracts are not feasible for purchase and delivery by small investors due to their high value, lack of fractional distribution, as well as the fact that the contracts themselves are impossible to hold over an extended period of time as they are set to expire. In fact, the primary purpose of the traditional commodities exchange is to facilitate hedges for large players in a particular industry in which physical delivery is not normally made.

In other related market services, pricing for product is derived from the most actively traded contract month. In the traditional market, this has become the standard because the largest players of an industry, who control the distribution channel, use paper contracts for hedging purposes when conducting their large trades. Therefore, pricing for the actual products is not true or real as pricing is not in a real time environment and doesn't directly represent the true voice of the consumer or end user of product. For example, a large supplier of American Gold Eagles one ounce coins might sell only 100 ounce lots at a price that is based on the most actively traded month for a futures contract on the New York Commodities Exchange (COMEX). The broker that is reselling from the 100 ounce lots might sell 20 ounces at a time to retail jewelry or coin stores and will price product in the same manner. The broker will likely include an additional premium or commission for transaction costs and profit margin. The retail jewelry or coin store might resell one at a time to individual investors in the same manner. The total transaction cost ultimately paid by the end customer can be substantial considering that each market participant in the distribution chain also allows for a market risk factor in case the contract price of gold (100 ounces) has dropped. The price of the product might change due to price of the paper futures contract changing even though the actual supply and demand of the product has not changed. This practice doesn't allow for true market pricing of each individual commoditized product as dictated by real buyers and sellers.

Due to controlled (or lack of) access to markets, current trading platforms give advantage to large volume buyers and small buyers must pay a premium price due to brokerage fees and minimum trade sizes. Additionally, large volume orders are matched with similar volumes, and it is not advantageous for large sellers to have an order filled by many small buyers, because they must transact many contracts and pay for many shipments. Brokers may combine incoming trades from small buyers or sellers and conduct one transaction to fulfill his obligation, however, the broker does not represent both parties to a transaction. In fact, it is common practice for brokers to actually buy at one price, sell to their customer at a higher price, and collect a commission from their customer, all at the same time. This practice is commonly referred to as "making or playing the spread". In such a case, the end buyer or seller obviously has no true voice in the marketplace.

Catalogues provide buyers with many choices of products to purchase with a set asking price. The asking price includes margins. As the price of the product fluctuates, the asking price must be updated by the seller, sometimes on a frequent basis. On some sophisticated catalogues, pricing might be tied to a certain suppliers price schedule or even to a futures exchange. For example, one online catalogue for precious metals products is linked to the NYMEX and COMEX futures contract exchange for pricing. Once an order is placed on the catalogue, the order still has to be fulfilled with the actual product sold, which is unavailable on the exchange. This form of pricing is not accurate and does not ensure efficient or accurate pricing and is not automatically fulfilled. Current catalogue systems are not integrated with an order matching system and therefore do not benefit from real time pricing with immediate order fulfillment. The fulfillment and shipping requires a series of steps to completion.

Auctions are another means of trading on the internet. Sellers list products and buyers bid on the price they want to pay for the product. Auctions are time defined because the product is offered for a set amount of time and is matched to the highest offer at the expiration of the auction. In addition, the underlying value of the product might be fluctuating during that time-frame. A bid placed on the initial offer date may not be a fair price one week later for some goods, such as precious metals, coins, and gemstones. In addition, auctions do not provide for combining orders. Even though there may be several buyers, only one gets the item because buyers are pit against each other. Pricing is determined by the bidding, not the real time value of the item. In an auction format, the buyers and sellers must deal directly with each other, are often known, and share the risk of the transaction. Furthermore, it is difficult and time consuming to buy from or sell to a large number of parties at the same time.

For commoditized products, the current systems available for commerce do not provide for distribution efficiency, do not allow small players to participate equally, and do not provide a real time pricing system based on real time supply and demand principals. Thus there is a need in the art for a system and method for providing secure trading, qualification, and delivery of a commoditized product. There is a further need for providing individual buyers and sellers with an anonymous, non-discriminatory means to exchange product without the burden of authenticating transaction elements and details including buyer/seller qualifications, product qualification, payment, and order fulfillment. There is a further need for a continuous market that is accessible and open 24 hours daily, seven days a week and 365 days a year. There is also a need for automatic price determination and automatic price matching that is not limited by market makers or by uneven buyer to seller units. And further there is a need for efficient distribution of commoditized products. Also, there is a need for buyers to be able to purchase from more than one seller at a time and receive delivery, if they so choose, at one time with one shipment, and the ability to pay one source. There is also a need for a seller to be able to efficiently sell to more than one buyer at a time, and be able to ship one package to one source, if they so choose, and receive a payment from one source. There is also a need for a secure payment method by which seller can receive payment prior to delivering product.

SUMMARY OF THE INVENTION

The foregoing needs of the market are met by a method and system for the secure electronic trading of a commoditized product. In one aspect, the system and method provides for order matching that is not auction based, and provides real time pricing via real orders on a hub centric platform that is product focused rather than market focused. All trades are guaranteed on the buy and sell, products are authenticated, and all players participate equally regardless of size. The price is automatically adjusted for the market, and the system is available 24 hours daily 365 days a year. The market of the invention is a continuous market that has the ability to move in real time on a seconds notice based on real orders, not limited to a market-maker's bid and ask. The system provides access to real orders that the customer can execute against and no one really controls the channel to execution of the order. This is a real order exchange in a real time environment. A small player has just as much opportunity to get the next competitive price as a large order that might be priced behind them.

Trading efficiency is apparent because an individual buyer that wants to conduct ten different trades or buy ten different units of a product, has the ability to match orders against ten different parties of a platform to have the advantage of dealing with only one transaction, the transaction with the hub. The orders will be matched with the 10 most competitive offers, without shopping in several different locations. A seller who would not normally entertain a transaction with a small player is now selling to several small buyers in one transaction. The hub centric model levels the playing field and opens up channels of trade previously not profitable. The seller does not have to ship the product to 10 different buyers, or open ten different accounts.

Buyers do not have to search for and qualify each potential seller. Buyers now have the capability of accumulating any number of orders that match with any number of sellers without the burden of establishing an equal number of relationships. Now, only one relationship would need to be established and maintained with the hub. Distribution efficiency is attained by shipping several different orders through one shipment. For example, a builder purchases 3 windows, 25 nuts, 25 bolts and 15 4 by 8 sheets of plywood, and 4 pallets of roofing shingles resulting from orders matched to 20 different sellers. All can be shipped in one shipment. The same is true for a buyer purchasing 25 gold coins at $270.00 per ounce, where there were 2 different sellers, one selling 20 coins and one selling 5 coins. In both cases of the builder and the coin purchaser, one transaction was implemented and one shipment is sent at a dramatic decrease of transaction costs to all parties involved.

Sellers do not have to advertise to establish new relationships and they have the ability to view all these orders in the market and decide if they want to place a matching order or place another order in the market. It is possible to know the depth of the market for each product and neither the buyer or seller need to assume the risk of credibility of the other party in the transaction because it is assumed by the hub. In addition, sellers remain anonymous to other members. For example, a seller now has the ability to place one order for 1000 1/10 ounce American Gold Eagle coins valued at $30 each. The order might match with 1000 different buyers in 1000 different locations. The seller would be able to send one shipment to the hub at a cost of approximately $25.00 and receive one payment from the hub for $30,000 less a small clearing fee. Obviously, this ability to efficiently access the market would dramatically decrease their transaction cost.

The hub centric system provides for a process to qualify buyers and sellers using uniform standards. Once a new customer has opened an account, a process for qualifying and then authorizing the customer is initiated. This process includes, but is not limited to verify financial standing and market position. A trading power is defined based on this and other relevant information. The customer is then free to transact business with the hub within the parameters set on their account.

The hub also provides a process for the qualification of product, including but not limited to authentication and verification. Once incoming product is received at the hub, the product is verified to meet the specifications of the matching order. The product can also be inspected or authenticated using best practices for the particular industry. This process ensures that the 1000 matching buyers for the product receive verified and authenticated for themselves. For example, when a seller ships in 1000 ¹/₁₀ ounce American Gold Eagle coins, the hub qualifies the product which includes, but is not limited to, counting, weighing, inspecting and authenticating the gold coins. The authentication process includes, but is not limited to, examining color, measuring size, displacement, and weight. Advanced technology might be used to determine metal content.

The hub provides a way for payments to be distributed securely to customers by using a system involving, but not limited to, clearing accounts, banking processes, and for some payment types, a special account structure with predefined restrictions. One such payment type provides a secure way to pay seller prior to product delivery. When a seller has executed orders on the hub trading system, they can opt for payment prior to shipping product to the hub. Upon request, a prior pay payment is sent from a special account that has restrictions based on the prior pay contract. The customer may deposit payment into their bank account prior to sending product. Once product is received and qualified, the restrictions on payment are automatically released through an automatic process involving software but can also be done by a manual process. This form of payment gives the seller a binding payment instrument and therein provides an extraordinary level of security for the seller before releasing product from their possession. As an auxiliary service, the hub also provides the packaging material for the shipment along with a prepaid shipping label. Insurance is also provided on return package.

In other aspects, further services can be offered from subhubs that link to the hub centric model. For instance, when catalogue sales are tied to the hub centric model or one of the sub hubs, the price is constantly updated from the link to the market for that specific product and the margin is built in or defined by the catalog operator. Therefore, it isn't necessary to manually update the catalogue inventory at specific intervals because it is done every time the market price changes. Furthermore, a catalog order can now be immediately fulfilled by initiating an immediate market order for the exact product sold. This system would allow for continuous real time pricing and fulfillment of catalog orders 24 hours daily, 7 days a week, 365 days a year.

DETAILED DESCRIPTION OF THE INVENTION

The present invention comprises a hub centric platform which has the capability to accept orders, match orders, organize and manage portfolios; qualify buyers, sellers, and products; distribute products and payments; and accept products and payments. All activities are conducted through the hub, which eliminates the need for individual buyers and sellers to interact. Orders are matched without discrimination based upon the size or volume of the order.

For purposes of the invention, the following definitions apply.

A "customer" can be either a buyer or a seller. The term "member" is interchangeable with any of these terms.

A "seller" can be anyone wishing to sell a commoditized product. This includes individuals, buyers, distributors, manufacturers, farmers, cooperative sales organizations, warehouses and the like.

A "buyer" can be anyone wishing to purchase a commoditized product, including individuals, buyers, distributors, manufacturers, farmers, cooperative sales organizations, warehouses and the like.

A "commoditized product" includes any product or service that has standardized specifications, such as size, weight, color, and quality.

A "commodity" is any commoditized product.

"Nucleo" refers to the entire hub centric system.

The hub centric platform can be a software system, or a manual system. The various functions can be linked by computer systems, telecommunication systems, or any means to quickly and efficiently carry out the assigned task. Advantageously, the platform can be a computer network linked and operated by software designed for specific functions.

The commoditized products traded through the hub centric system include any product that has standardized specifications including but not limited to, size, weight, color and quality. Commoditized products can include farm products, building products, precious metals, and non-specialized services such as shipping, and the like.

A qualification program can be carried out manually, or utilizing any state of the art automatic technology. Qualification programs include inspection and authentication of product, certification of credit worthiness of participants in the system, including but not limited to buyers, sellers, and manufacturers.

Buyers and sellers, or customers of the system include but are not limited to individual consumers, manufacturers, resource management entities, financial institutions, brokerages, mining facilities, cooperative sales organizations, and industry organizations.

Figure 1:
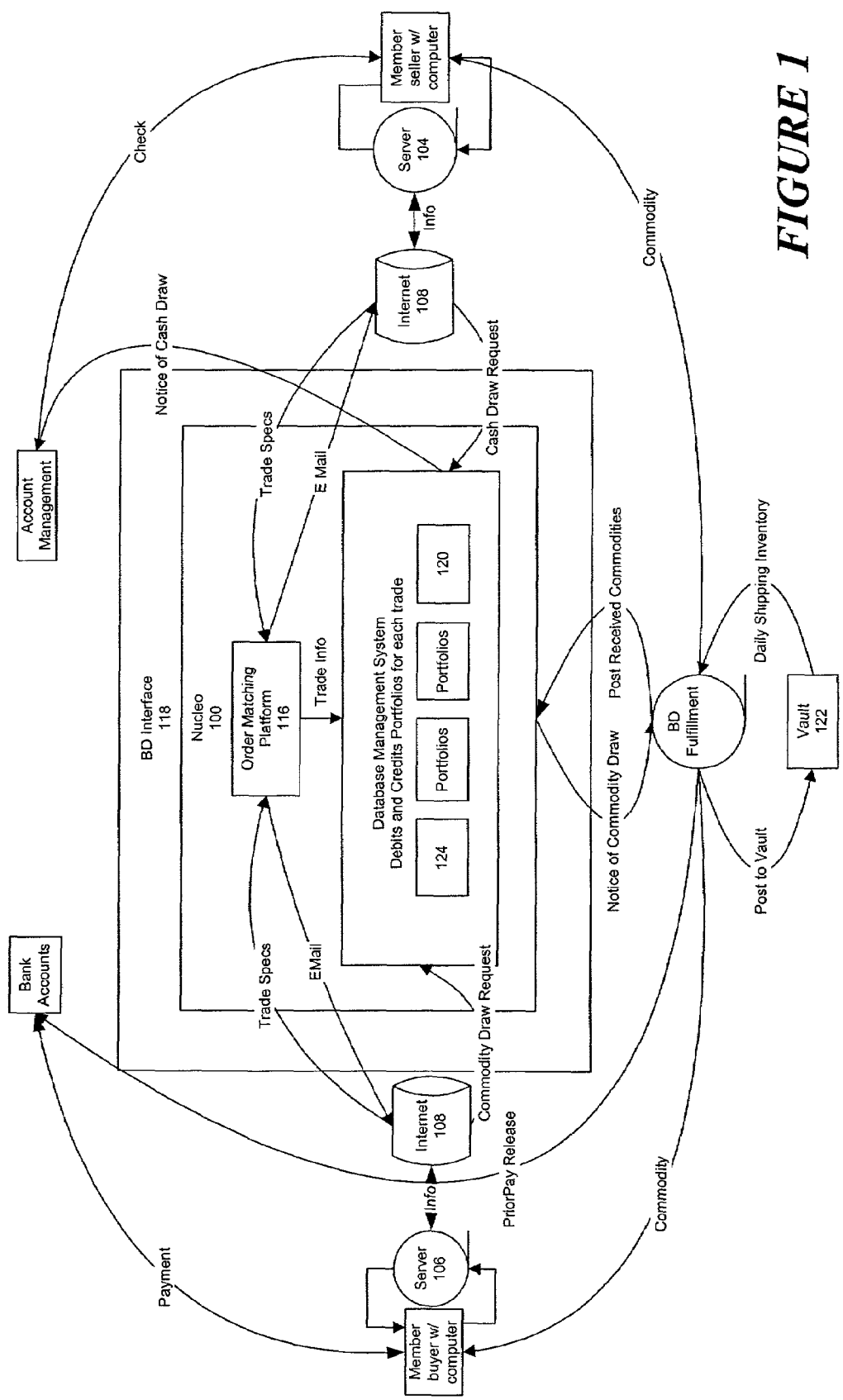
FIG. 1 is a functional block diagram illustrating the system architecture of an exemplary aspect of the present invention.

For purposes of explanation, the trading of a precious metal, such as gold bullion is used. FIG. 1 illustrates a functional block diagram illustrating the system architecture of an exemplary aspect of the trading system comprising a hub centric platform. The system comprises buyer sites 102 and seller sites 104 which can be any electronic source including but not limited to a home computer, a broker access means, a direct line from a manufacturer, individual or institution, or any means of telecommunication.

A server 106 which may be associated with the buyer site 102 or the seller site 104 connects to a distributed network of computers 108, such as the Internet. The distributed computer network 108 connects to the order matching routine 116 of the hub centric platform through an Internet website interface 118 or similar type interface between the server 106 and the Internet 108.

The hub centric platform, or Nucleo system 100 links an individual investor to a data base management system of the platform, where orders are accumulated, managed, and qualified. An order matching routine 116 running on the Internet server 106 matches a seller order with corresponding matching buy orders. Several buy orders may be necessary to match one sell order and this is performed automatically by the matching routine. Quality, quantity, and other commoditized product characteristics will also be matched by the order matching routine 116. The Internet website interface 118 permits a user to obtain information from and to communicate with the order matching routine 116. The order matching routine 116 can provide a user with up-to-date account information, real time market information, and a variety of market command options. The market trade specifications are continually provided to the order matching routine 116, enabling a buyer or seller to continually check the current price for the product.

The database management system maintains portfolios for buyers 124 and sellers 120. The database management system debits and credits the portfolios for each trade. Portfolios can be customer accounts which the buyer or seller maintains with the hub centric platform or any secured financial facility including but not limited to banks, credit unions, brokerage accounts or industry specified facility.

Figure 2:
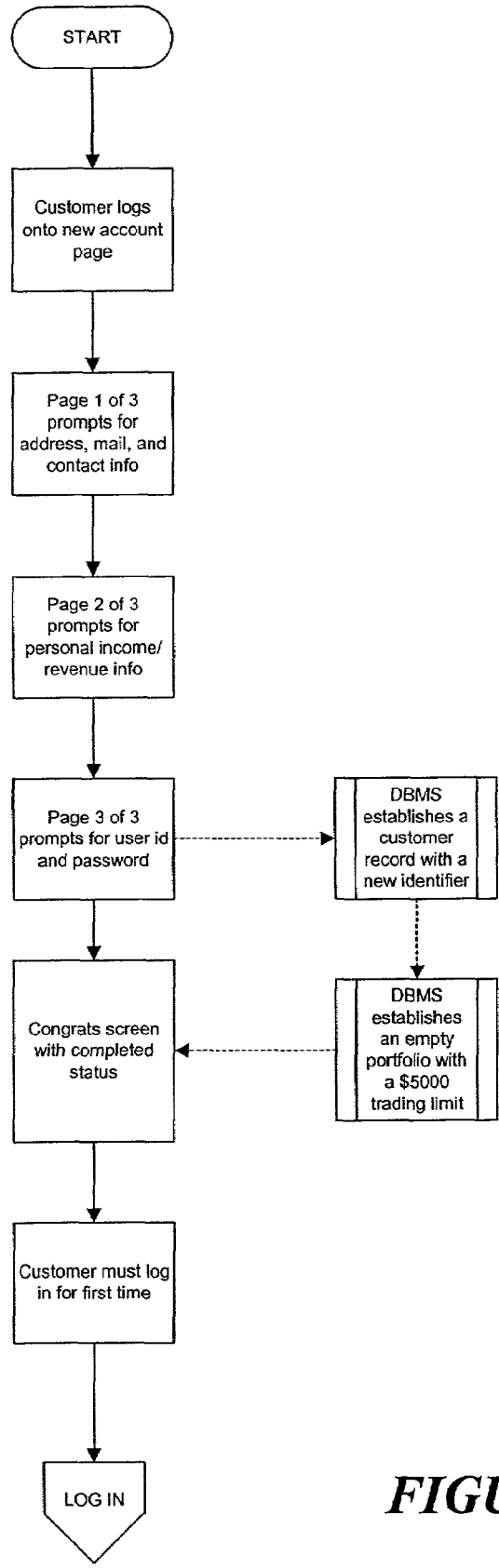
FIG. 2 is a flowchart illustrating an exemplary aspect of an account opening routine.

New customers access the system as explained in FIG. 2. The buyer or seller logs onto a new account page and enters requested information. A user identification and password are established. The Buyer or seller must log in for the first time. New customers are limited on first time trades until their credit information has been established.

Figure 3:
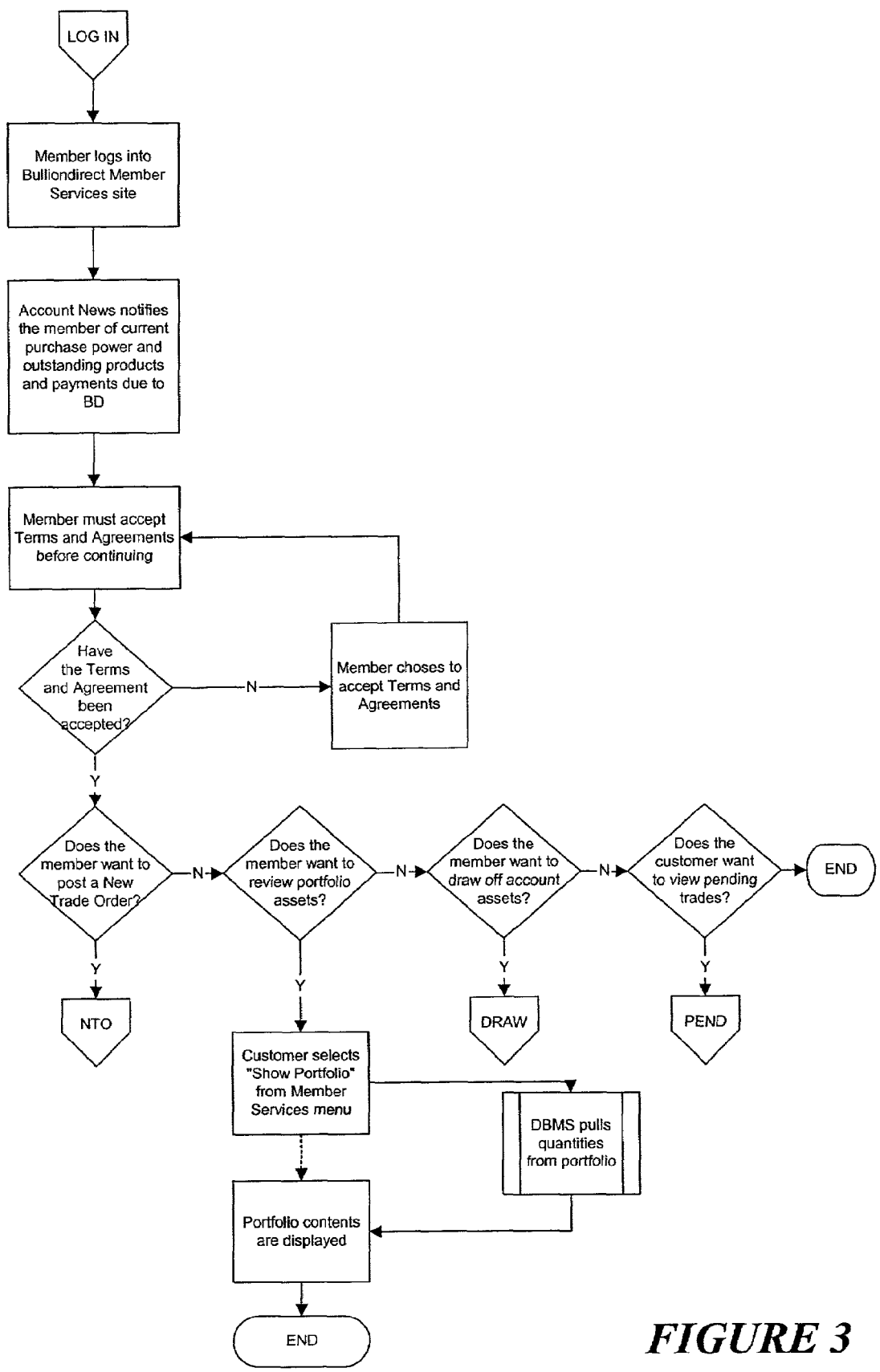
FIG. 3 is a flowchart illustrating a second method implemented by an exemplary aspect of the present invention.
Figure 4:
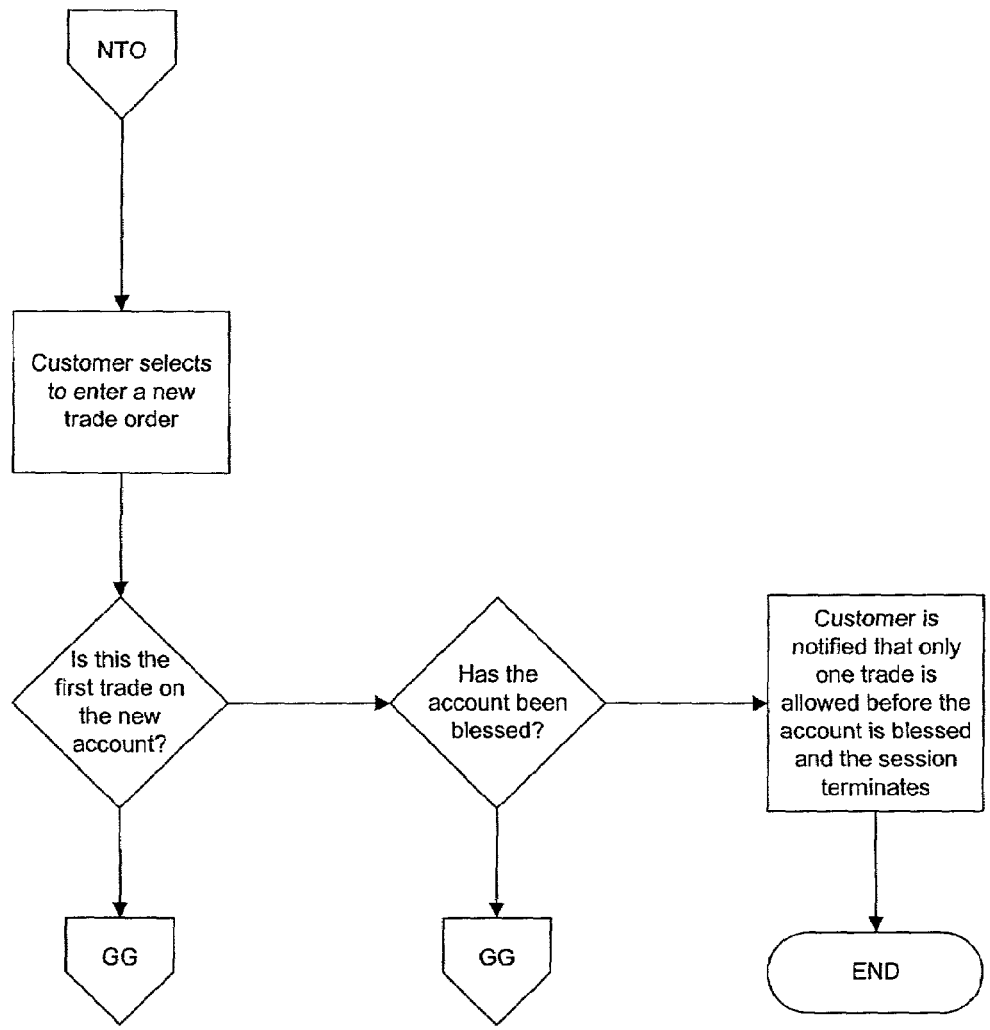
FIG. 4 is a flowchart illustrating a third method of an exemplary aspect of the present invention.
Figure 5:
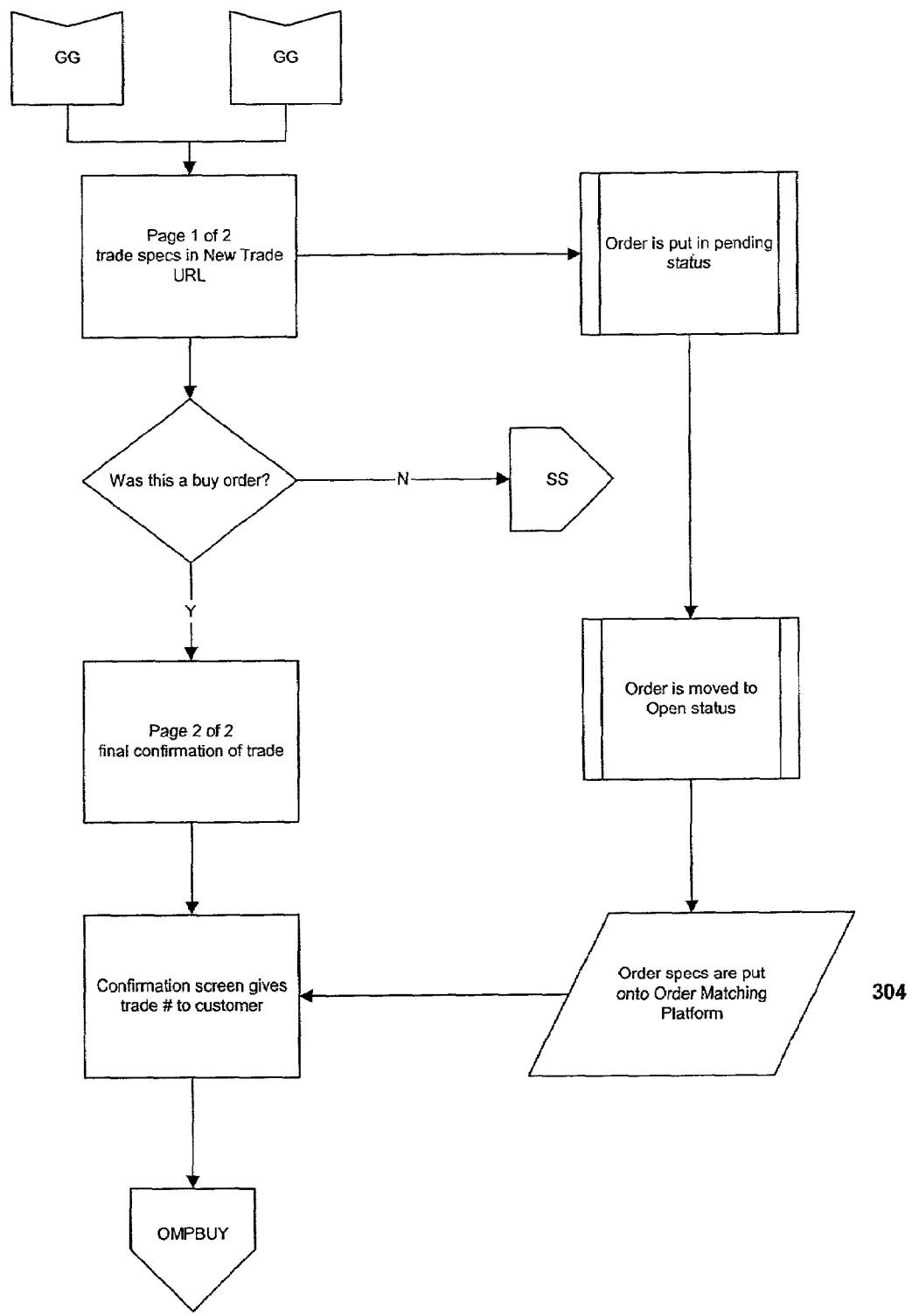
FIG. 5 is a functional block diagram illustrating a revenue model implemented by an exemplary aspect of the present invention.
Figure 6:
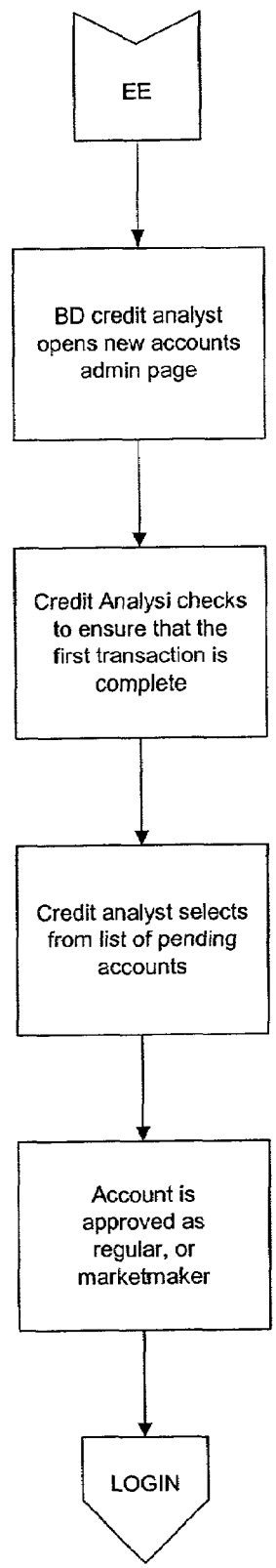
FIG. 6 is a flow chart illustrating the authorization of new accounts.
Figure 7:
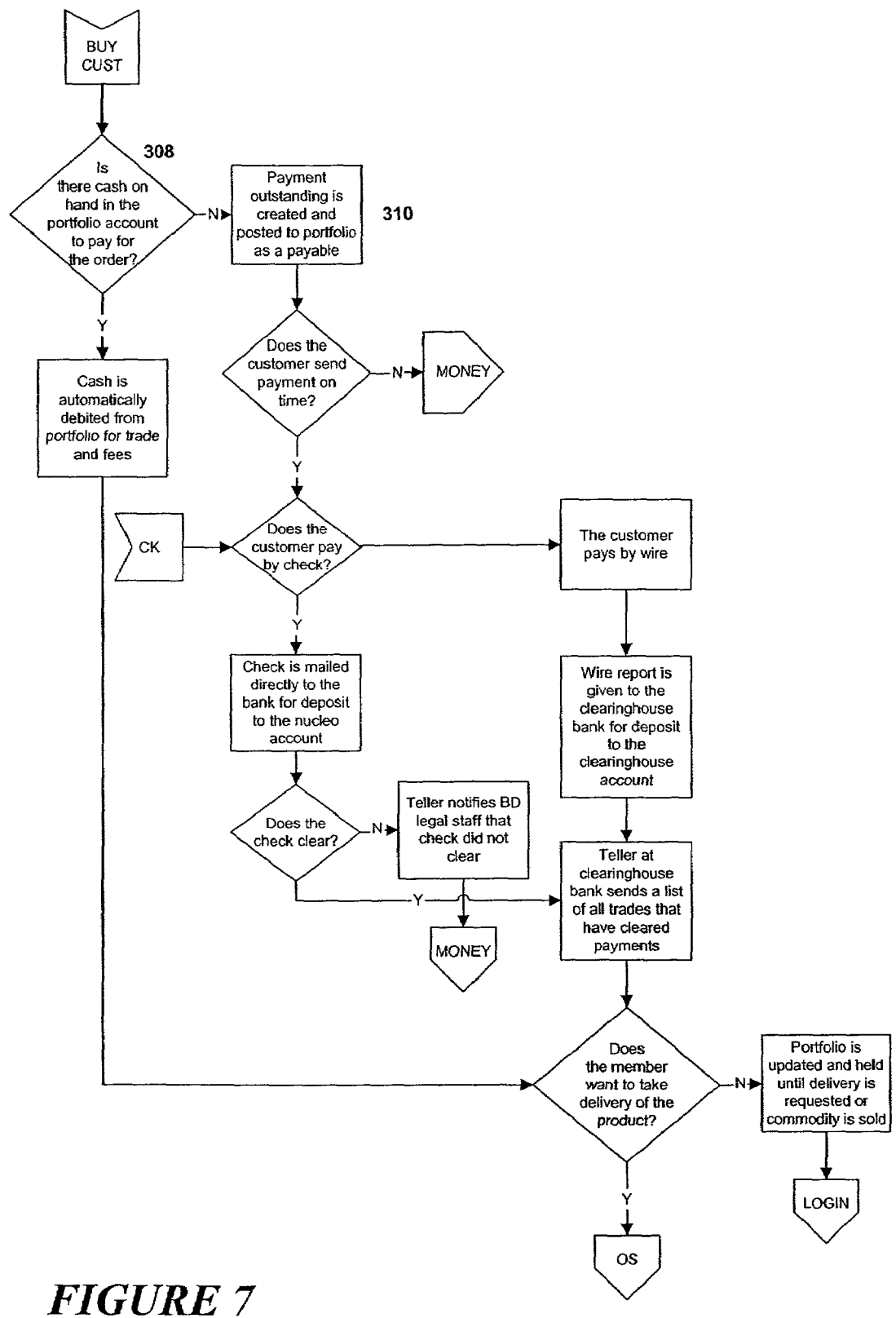
FIG. 7 is a functional block diagram illustrating an exemplary aspect of a buy order.

Established customers log into the site and can obtain information as shown in FIG. 3. Information on current trading power, and outstanding products and payments due are provided. In order to place orders, the customer must accept contractual terms before proceeding. Customers can view pending trades, review portfolios, post new orders, or draw from the current account. If the customer elects to place a new order (FIG. 4), the system determines if the customer is new or approved. FIG. 5 demonstrates the trade process where the seller or buyer places a trade. The order specifications are advanced to the order matching platform and confirmation of the trade is sent to the customer. FIG. 6 demonstrates the process for qualifying the customer account. FIG. 7 demonstrates an exemplary aspect of the authentication of payments and the determination of account balances for customer orders.

Figure 8:
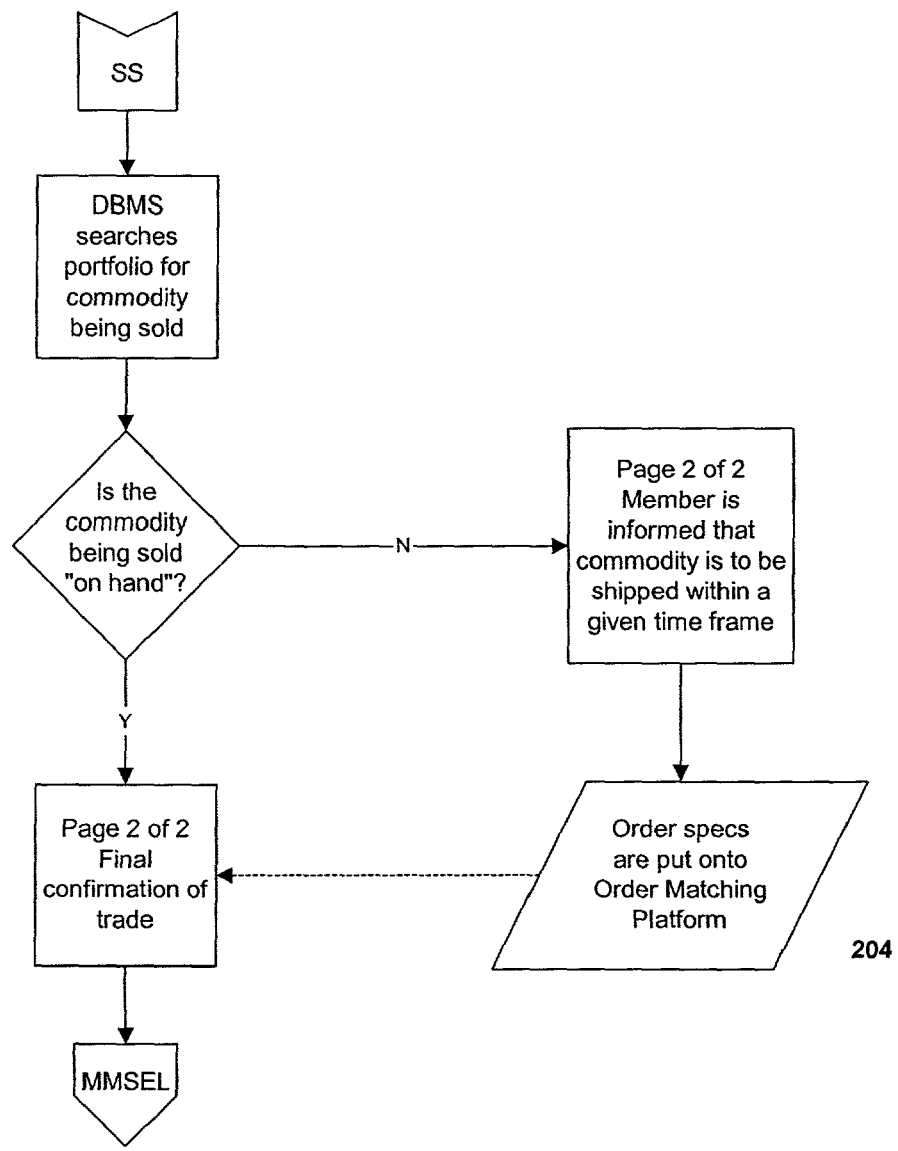
FIG. 8 is a functional block diagram illustrating an exemplary aspect of a sell order
Figure 9:
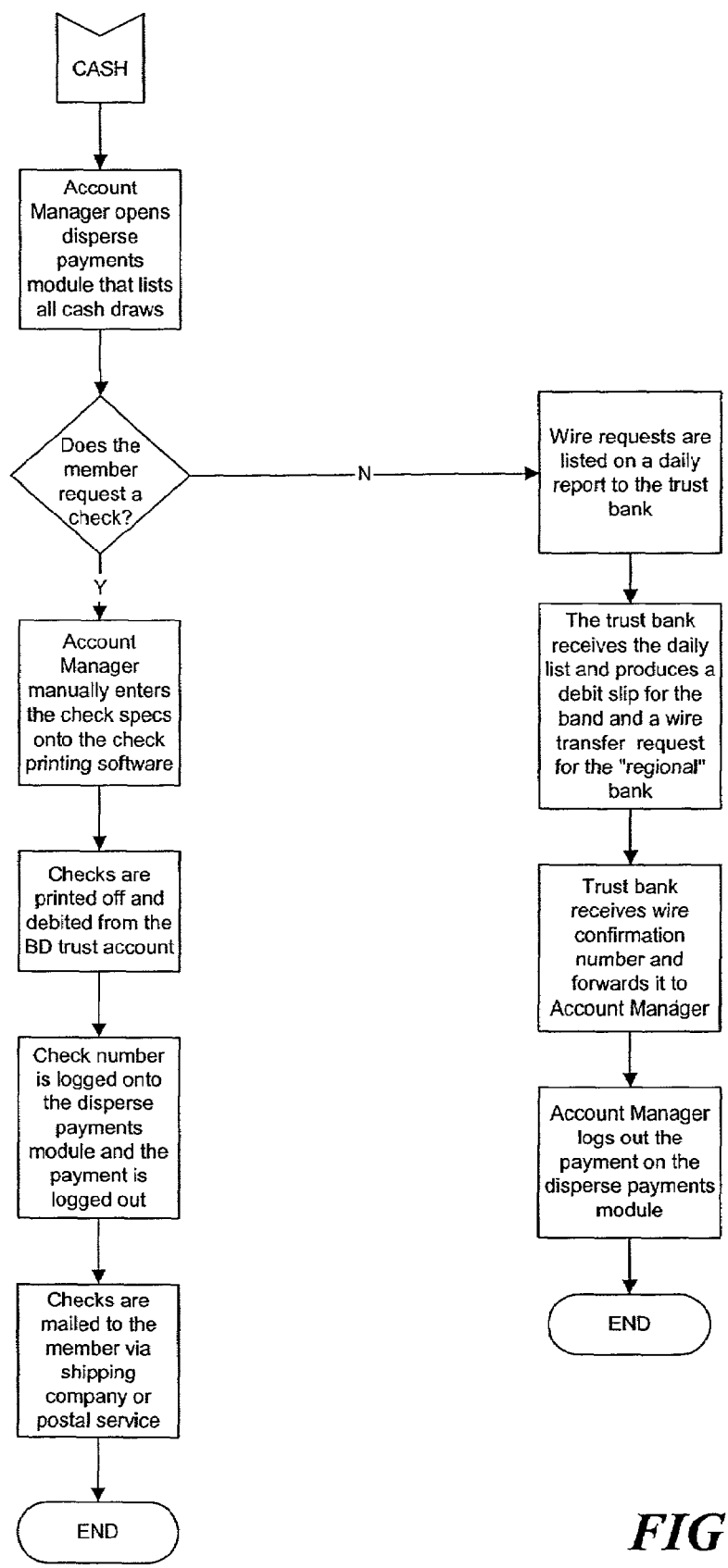
FIG. 9 is a functional block diagram illustrating an accounts payable routine.

Once the customer placing the order (buyer or seller) is qualified, the data base management system searches portfolios for the commoditized product being sold or purchased (FIG. 8). If the product is on hand (in the seller's portfolio), product is automatically delivered to the hub to settle outstanding trade. If not on hand, customer is given delivery instructions. Payment is issued to the seller through a payment routine such as one exemplified in FIG. 9.

Figure 10:
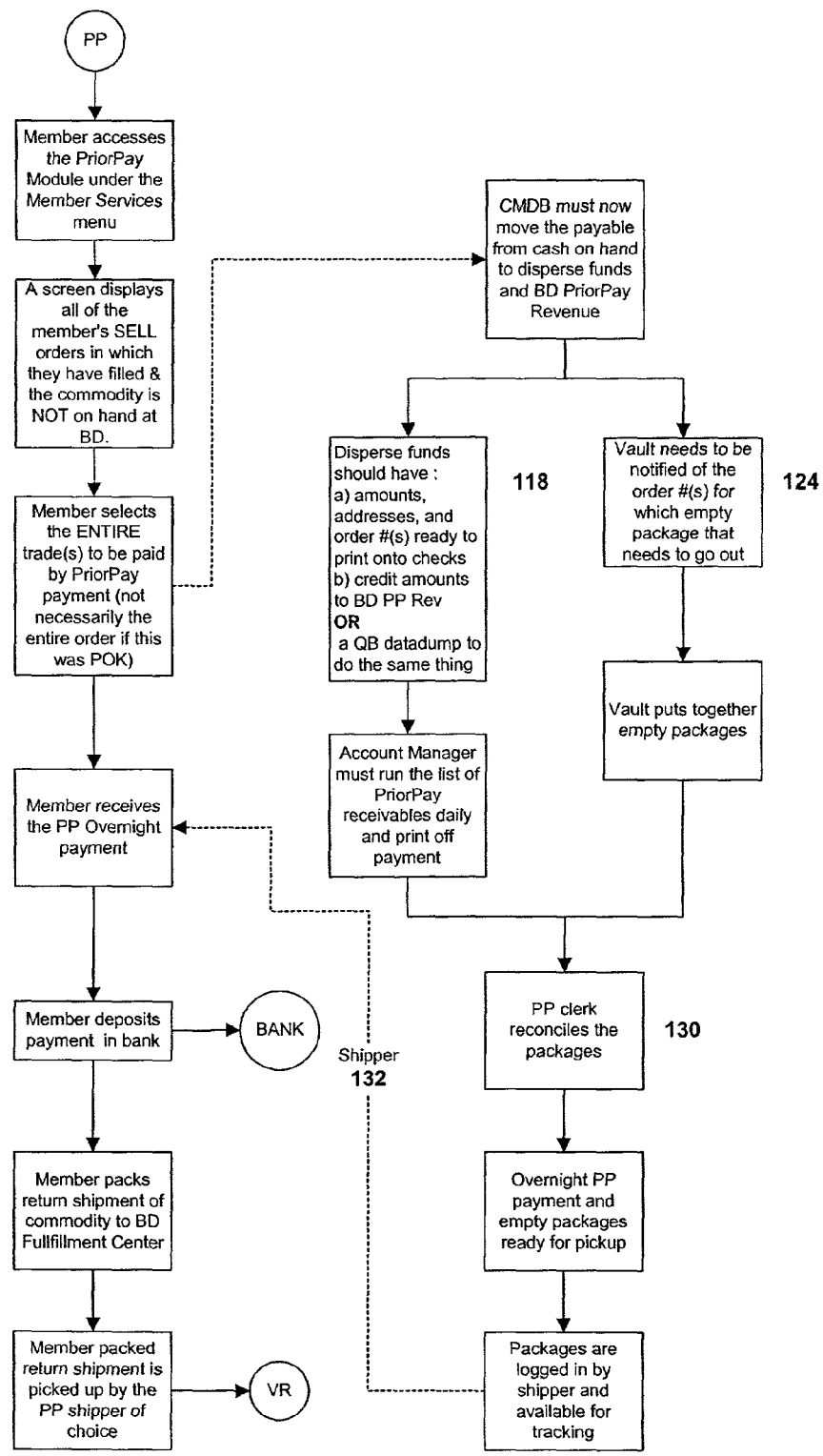
FIG. 10 is a functional block diagram illustrating the prior pay routine.
Figure 11:
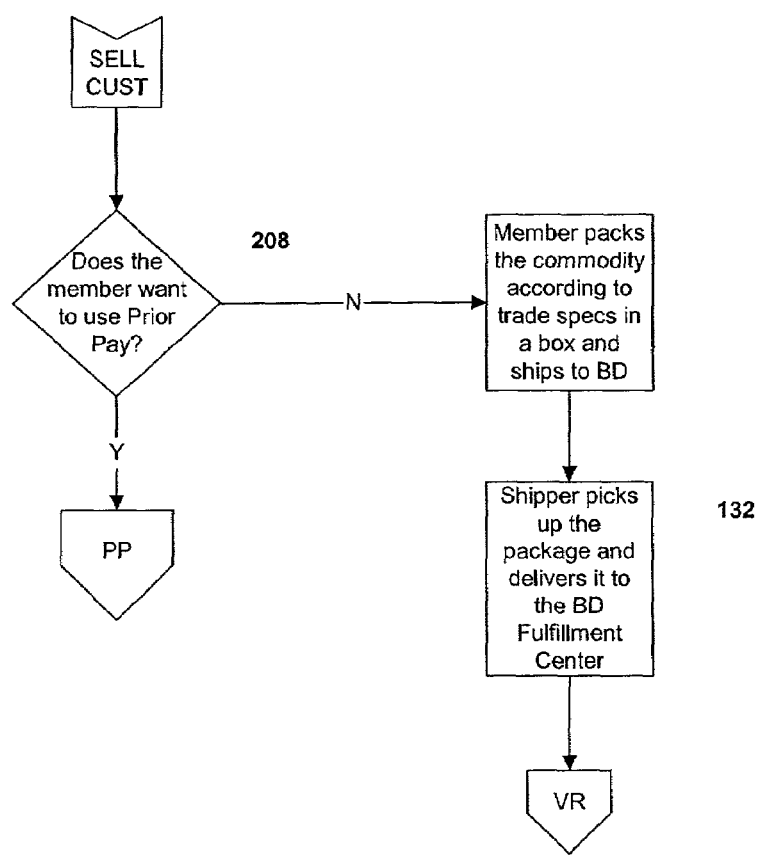
FIG. 11 is a functional block diagram illustrating an exemplary aspect of shipping selection.
Figure 15:
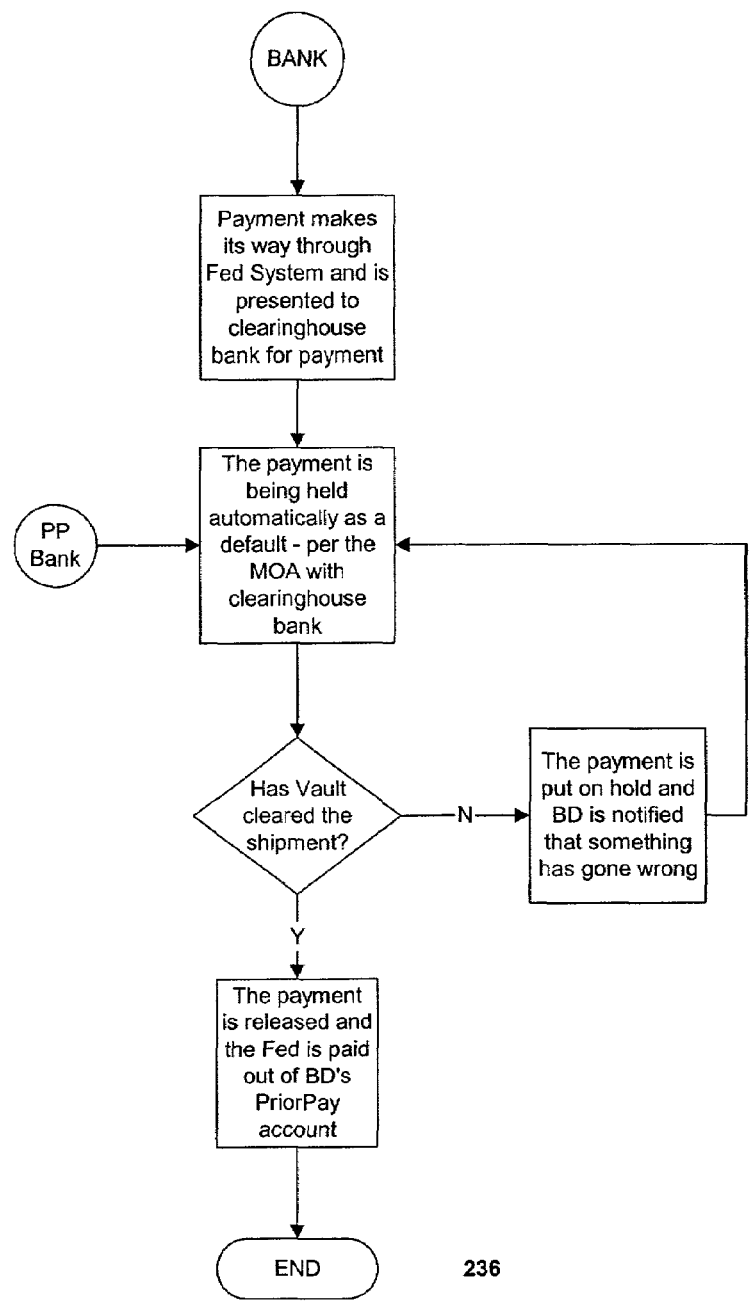
FIG. 15 is a flow chart demonstrating the prior pay bank routine.

If the product to be sold is not on hand, the seller can utilize several systems to send the product to the hub centric platform (FIG. 10). Any method of shipping can be utilized to ship the product to the platform, and payment can be issued once the product is received and authenticated. The product is then sent to the buyer. If the seller elects the prior pay method of shipping the product (FIG. 15), the hub centric platform system sends a payment to the seller. The payment acts as a contract that operates as a reverse hold on the funds in the payment. If the seller meets the conditions of the contract, for instance the product is received by the platform, and is authenticated, then the hold is removed and the funds are dispersed. This payment contract can be deposited in a financial institution as soon as it is received by the seller. Optionally, the shipping containers and prepaid shipping labels can be sent with the payment (FIG. 11).

Figure 12:
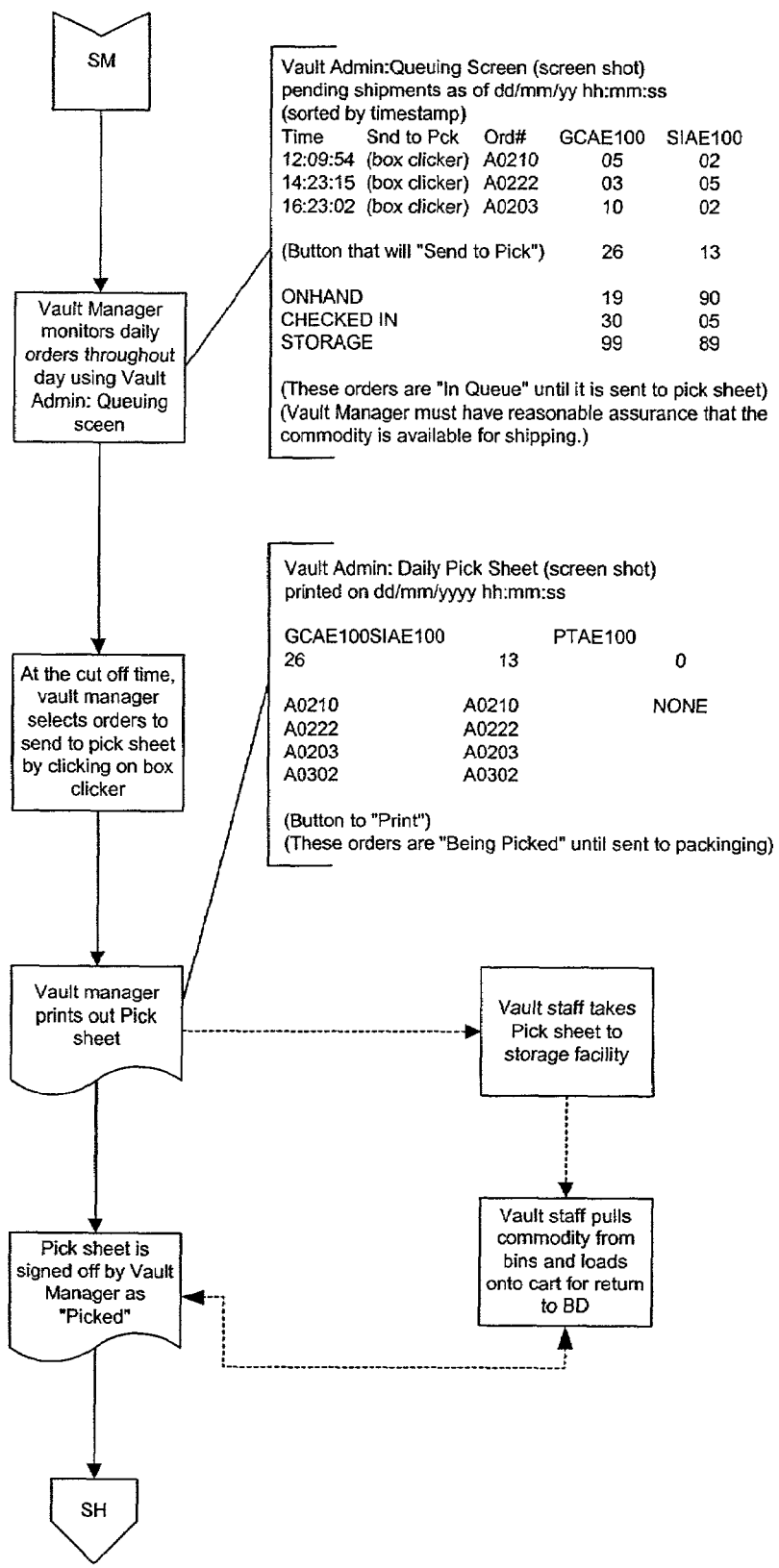
FIG. 12 is a functional block diagram illustrating an exemplary aspect of distribution.
Figure 13:
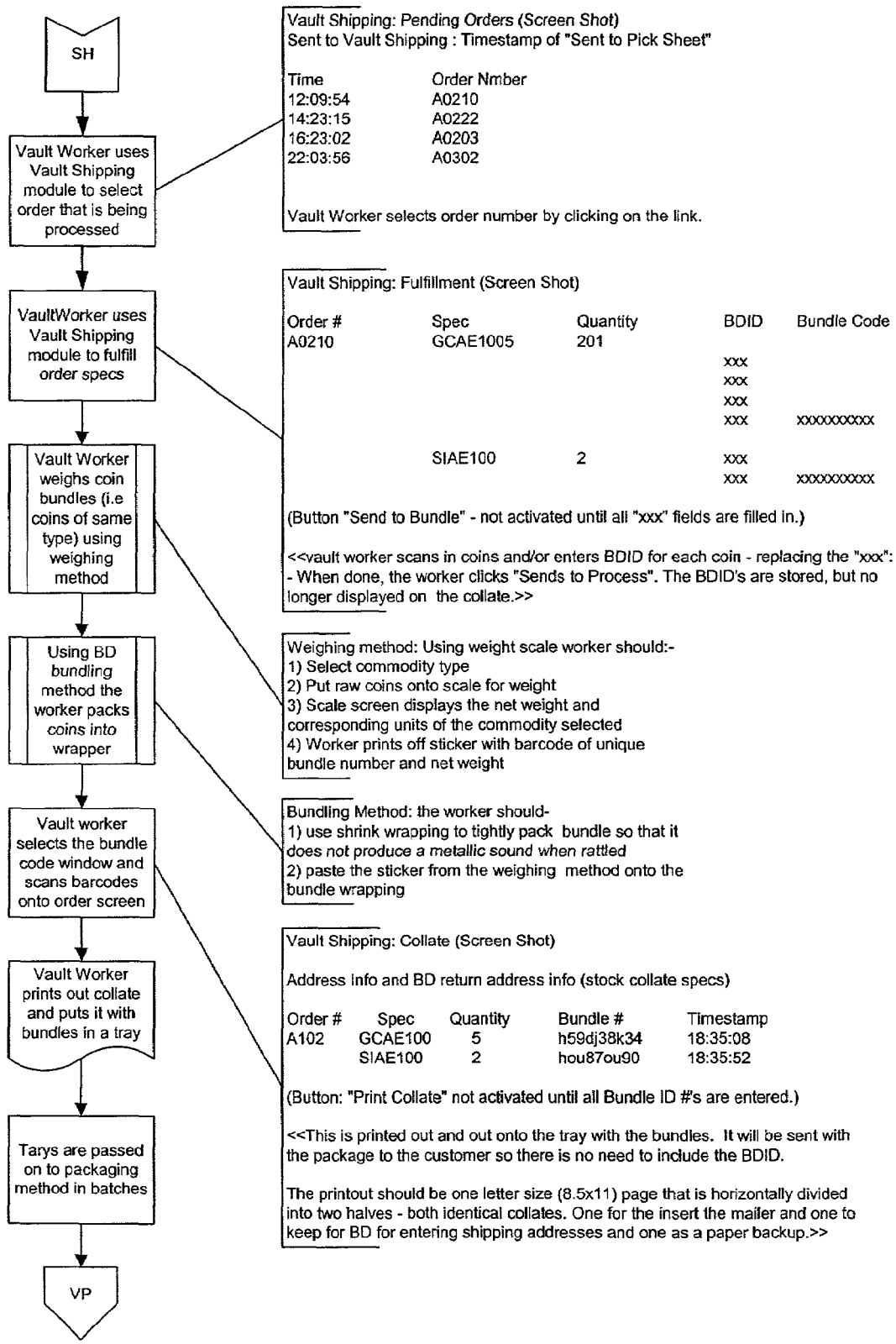
FIG. 13 is a functional block diagram illustrating an exemplary aspect of distribution.
Figure 14:
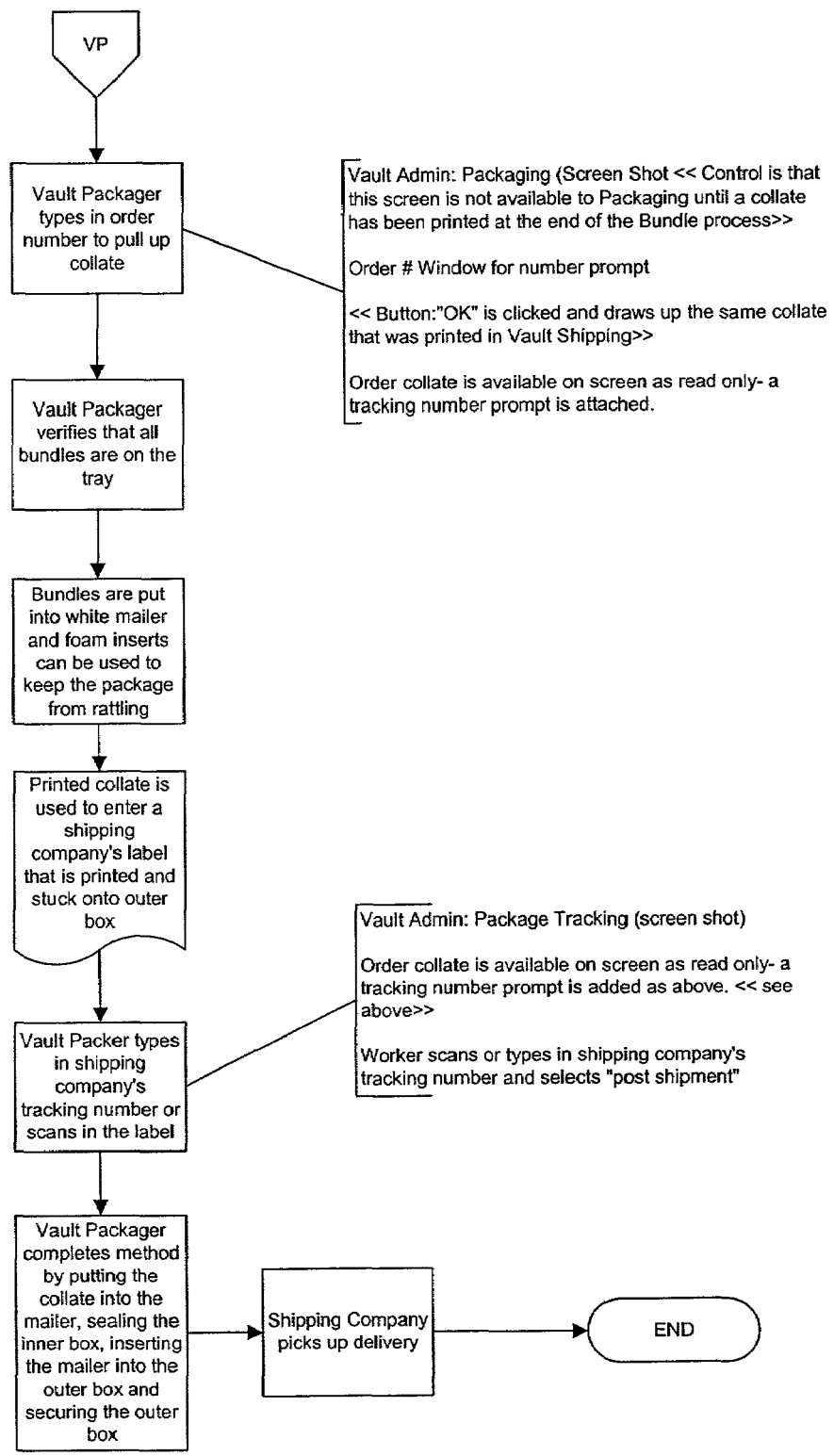
FIG. 14 is a functional block diagram illustrating an exemplary aspect of distribution.

The hub centric system also incorporates distribution routines. Product can be received and distributed through the platform, so that several orders can be combined from several sellers to provide only one shipment for the buyer. Conversely, several buy orders can be distributed from one sell order without requiring the seller to ship to several locations. All shipping of commoditized product goes through hub centric the platform. Package handling can be manual, or automated using various scales and mechanical devices known in the art. Shipping can be provided by shipping companies including but not limited to FedEx, UPS, Airborne, and the like. (FIGS. 12-14)

Figure 16:
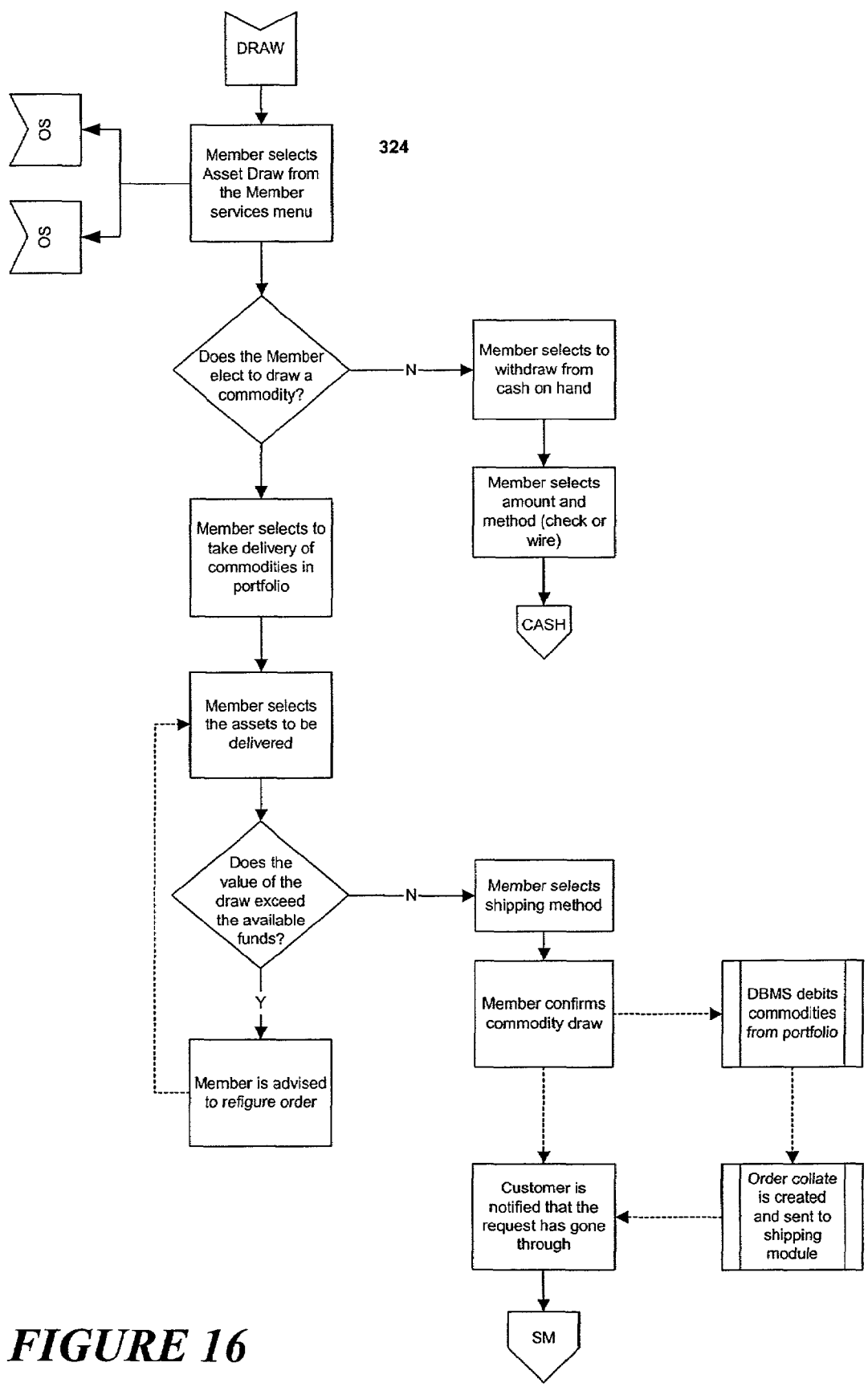
FIG. 16 is a flow chart demonstrating draw options.

Whenever a customer elects to withdraw assets from their portfolio, there are several choices that can be made. If the customer wishes to be paid cash, a check or wire can be sent by means known in the art. If the customer chooses to take delivery of the commoditized products in the portfolio, a shipping method must be selected (FIG. 16). The data management system debits the commoditized products from the portfolio.

Figure 17:
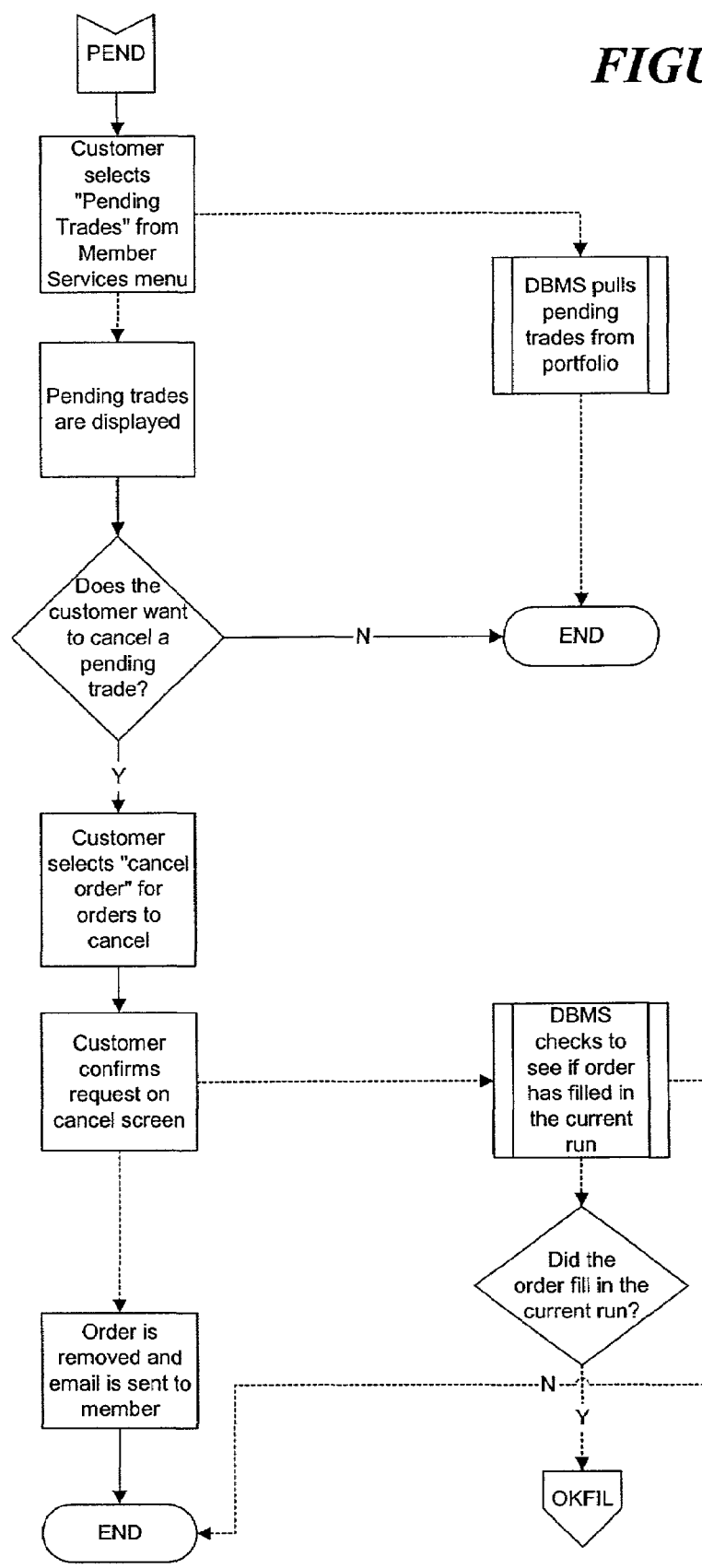
FIG. 17 is a flow chart demonstrating pending trades.

Once an order has been placed, and there is not a match to facilitate an execution, the order then resides in the market until it either matches, expires (if applicable), or is cancelled (FIG. 17)

Figure 18:
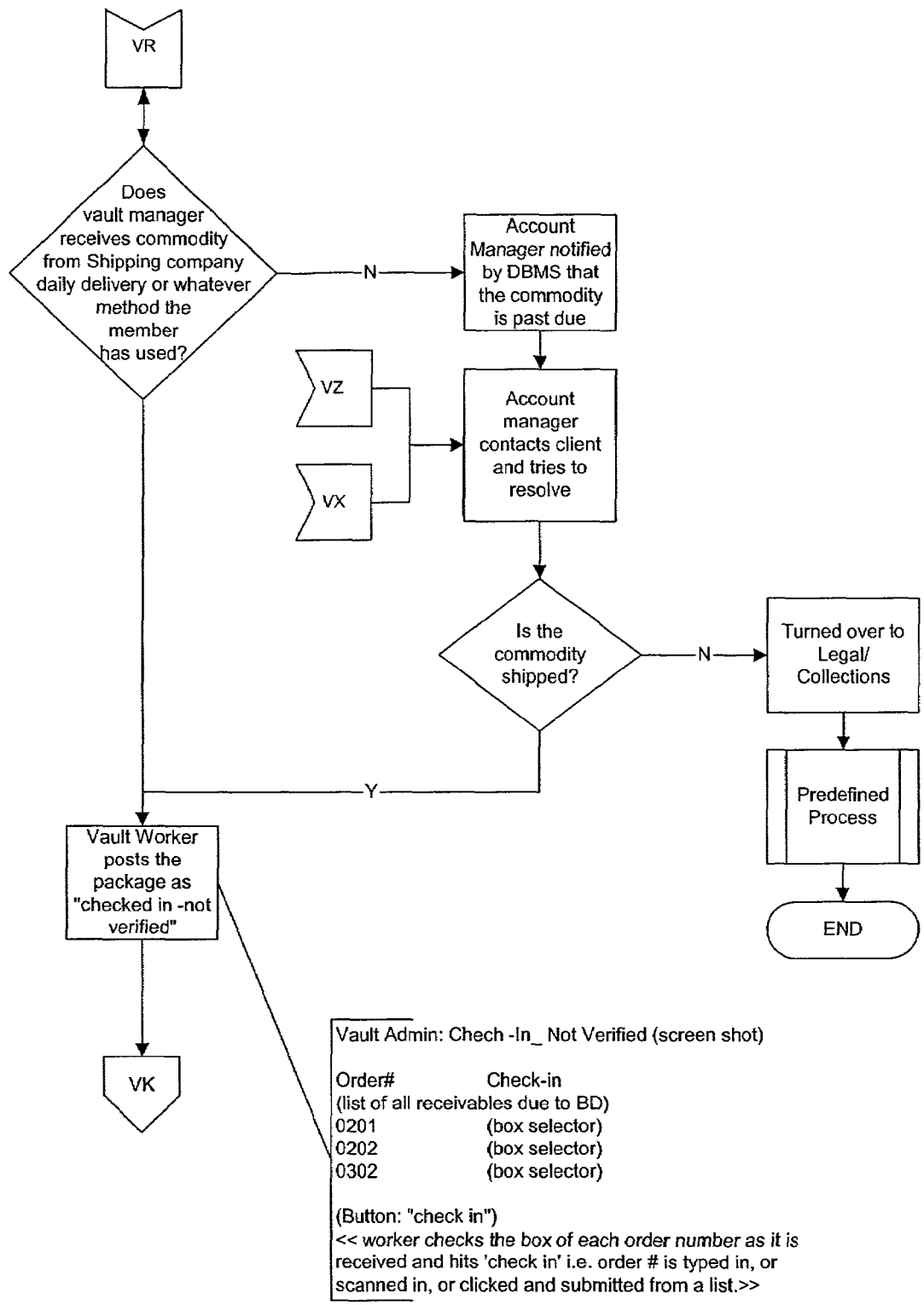
FIG. 18 is a flow chart demonstrating a receivables routine.
Figure 19:
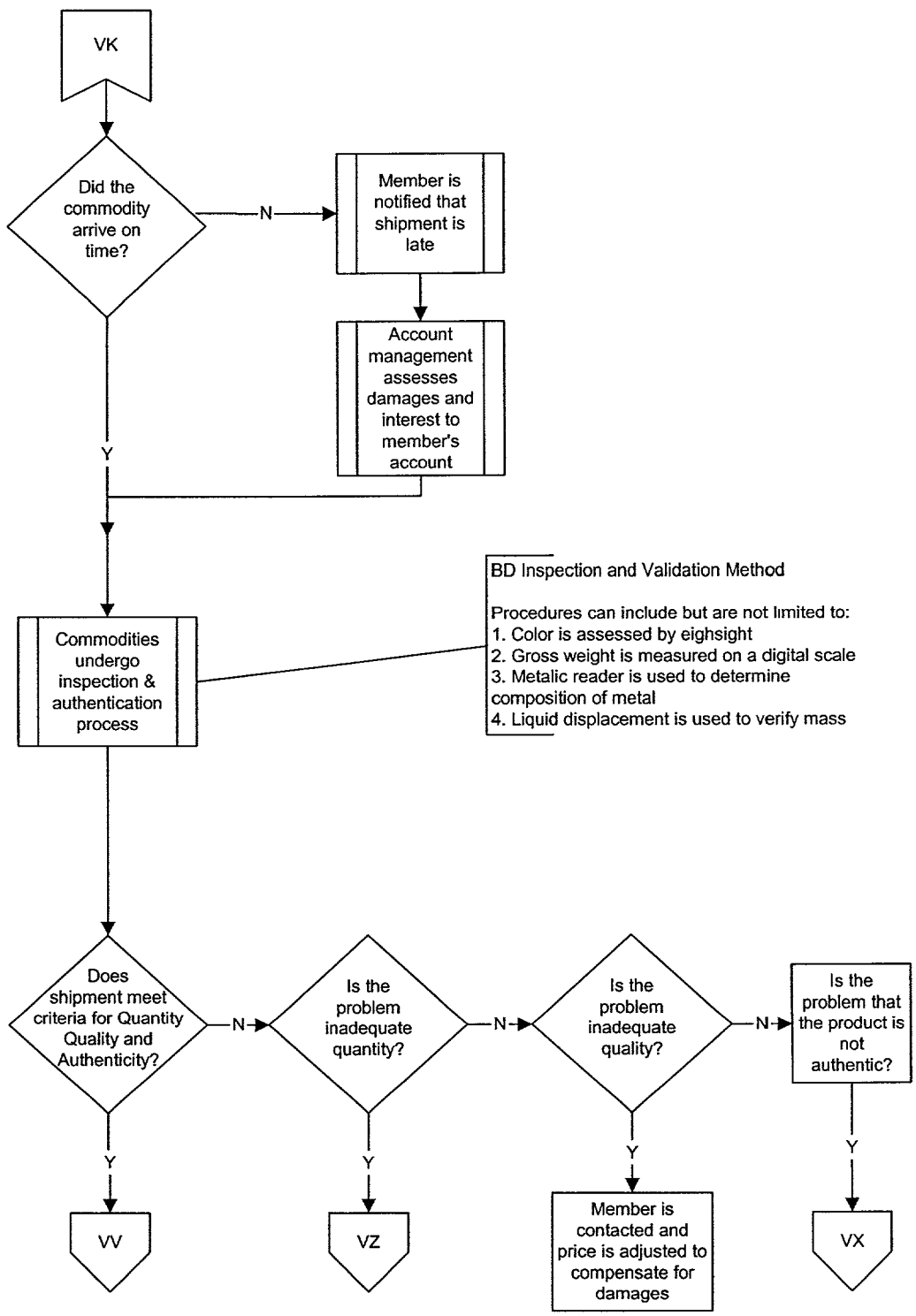
FIG. 19 is a flow chart demonstrating the qualification of product.
Figure 20:
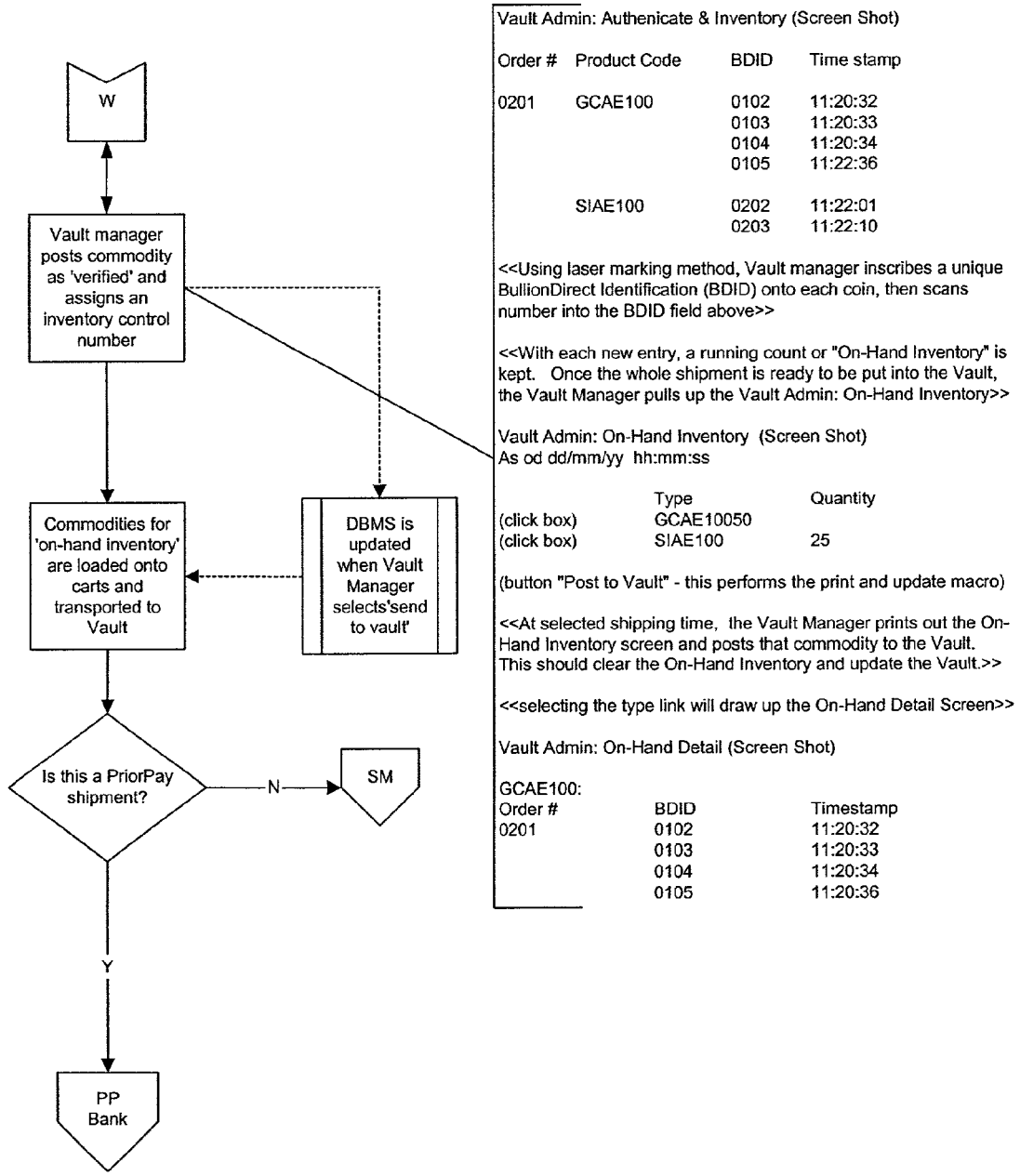
FIG. 20 is a flow chart demonstrating an accounts receivable routine.
Figure 21:
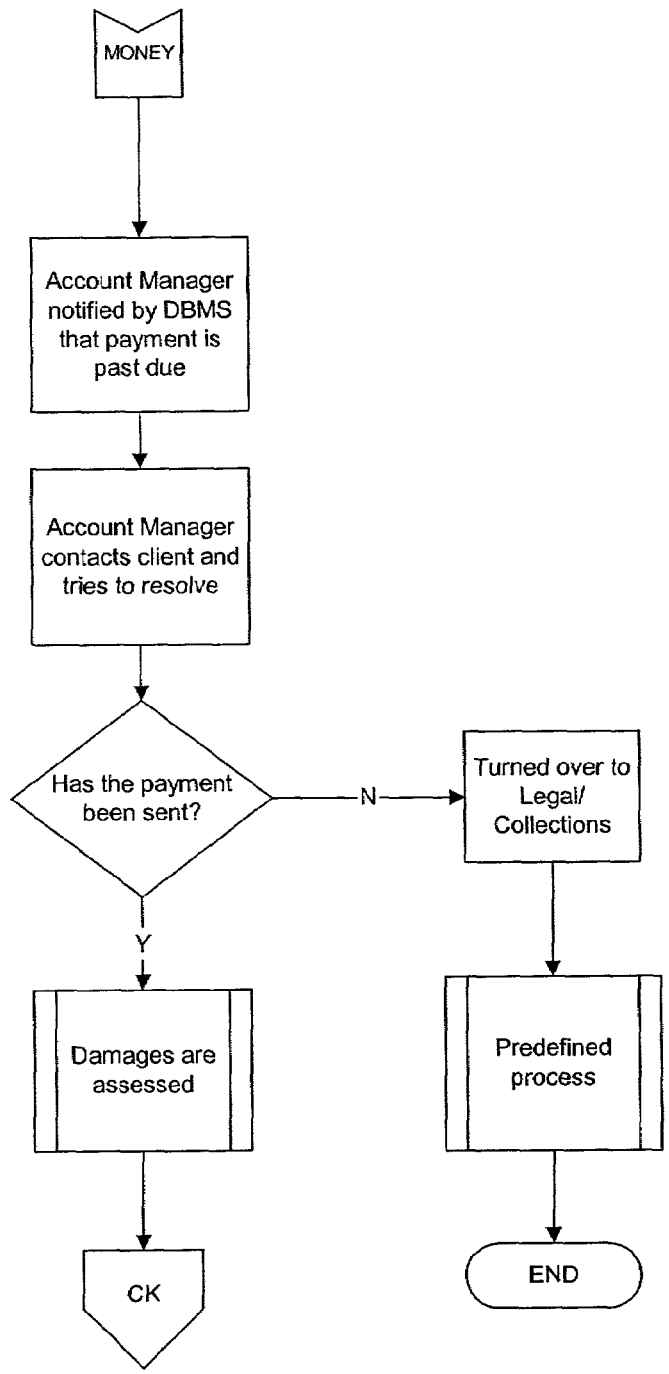
FIG. 21 is a continuation of the functional block diagram in FIG. 7.

When the customer sells product that is not in their portfolio, they are required to send product to the hub where product is then received (FIG. 18), qualified (FIG. 19), including but not limited to weighing, inspecting, verifying displacement, and any other means available to the industry. Once incoming product is received and qualified, product is then posted to customer's account (FIG. 20). Payment can now be made to a customer for corresponding trade value without lien.

Although an illustrative example of the present invention and various aspects thereof have been described in detail herein with reference to the accompanying drawings, it is to be understood that the invention is not limited to this precise example and that various changes and further modifications may be effected therein by one skilled in the art without departing from the scope or spirit of the inventions as defined in the appended claims.

We claim:

1. A method for facilitating trading of a commoditized product comprising electronically receiving at least one sell order from at least one seller to sell a commoditized product;

electronically receiving at least one buy order from at least one buyer to buy a commoditized product;

electronically matching the at least one sell order with the at least one buy order;

receiving commoditized product from the at least one seller;

physically qualifying the commoditized product after it is received from the at least one seller and before it is distributed to the at least one buyer;

distributing a seller payment to the at least one seller;

receiving a buyer payment from the at least one buyer; and distributing commoditized product to the at least one buyer.

2. The method of claim 1 wherein the at least one buyer comprises at least two buyers, and the at least one seller comprises one seller.

3. The method of claim 1 wherein the at least one seller comprises at least two sellers and the at least one buyer comprises one buyer.

4. The method of claim 1 wherein distributing commoditized product to the at least one buyer comprises one or more of accumulating the commoditized product in a portfolio account for the at least one buyer, or shipping commoditized product to the at least one buyer.

5. The method of claim 1 wherein distributing a seller payment to the at least one seller comprises a prior pay service.

6. The method of claim 5 wherein the prior pay service comprises
sending a payment to the at least one seller, wherein the payment is subject to a hold; and
releasing the hold on the payment when the commoditized product is received from the at least one seller and physically qualified.

7. The method of claim 6, wherein physically qualifying the commoditized product received from the at least one seller comprises determining whether the commoditized product received from the at least one seller matches the at least one sell order.

8. The method of claim 6, wherein physically qualifying the commoditized product received from the at least one seller comprises
determining that the commoditized product received from the at least one seller does not match the at least one sell order;
temporarily maintaining the hold of funds on the payment document;
notifying the at least one seller that the commoditized product does not match the at least one sell order;
receiving from the at least one seller one or more of additional commoditized product, information, and/or agreement to change the seller payment, such that the commoditized product received from the at least one seller is physically qualified.

9. The method of claim 1 wherein physically qualifying the commoditized product received from the at least one seller comprises authentication of commoditized product, inspection of commoditized product, verification of commoditized product, or any combination thereof.

10. The method of claim 1, wherein the commoditized product comprises any product having a size, weight, color or quality specification.

11. The method of claim 1, wherein the commoditized product comprises precious metal.

12. The method of claim 1 further comprising qualifying the at least one buyer before matching the at least one sell order with the at least one buy order.

13. The method of claim 12 wherein qualifying the at least one buyer comprises any one or more of obtaining information about the at least one buyer, verifying information provided by the at least one buyer, performing a credit check on the at least one buyer, and/or receiving a payment from the at least one buyer.

14. The method of claim 1 further comprising qualifying the at least one seller before electronically matching the at least one sell order with the at least one buy order.

15. The method of claim 14 wherein qualifying the at least one seller comprises any one or more of obtaining information about the at least one seller, verifying information provided by the at least one seller, performing a credit check on the at least one seller, and/or receiving commoditized product from the at least one seller.

16. The method of claim 1 wherein the at least one buy order is not limited by the size, volume, or amount of commoditized product ordered.

17. The method of claim 1 wherein the at least one sell order is not limited by the size, volume, or amount of commoditized product ordered.

18. The method of claim 1 wherein the at least one seller and the at least one buyer remain anonymous to one another.

19. The method of claim 1 wherein the at least one seller and the at least one buyer do not communicate.

20. The method of claim 1 wherein multiple buy orders can fulfill one sell order.

21. The method of claim 1 wherein multiple sell orders can fulfill one buy order.

22. The method of claim 1 additionally comprising providing real-time information regarding the market for the commoditized product.

23. The method of claim 1 wherein receiving commoditized product from the at least one seller comprises one or more of physically receiving commoditized product, or drawing commoditized product from at least one portfolio account without regard to its physical location.

24. The method of claim 1 wherein distributing a seller payment comprises one or more of distributing a payment instrument to the seller, or adjusting a seller's customer account.

25. The method of claim 1 wherein receiving a buyer payment comprises one or more of receiving a payment instrument, or adjusting a buyer's customer account.

26. A platform for facilitating trading a commoditized product comprising
means for electronically receiving at least one sell order from at least one seller to sell a commoditized product;
means for electronically receiving at least one buy order from at least one buyer to buy a commoditized product;
means for electronically matching the at least one sell order with the at least one buy order;
means for receiving commoditized product from the at least one seller;
means for physically qualifying commoditized product after it is received from the at least one seller and before it is distributed to the at least one buyer;
means for receiving a buyer payment from the at least one buyer;
means for distributing commoditized product to the at least one buyer;
means for distributing a seller payment to the at least one seller.

* * * * *

UNITED STATES PATENT AND TRADEMARK OFFICE
CERTIFICATE OF CORRECTION

| | | |
|---|---|---|
| PATENT NO. | : 7,584,135 B1 | Page 1 of 1 |
| APPLICATION NO. | : 09/860134 | |
| DATED | : September 1, 2009 | |
| INVENTOR(S) | : McAllister et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1626 days.

Signed and Sealed this
Sixth Day of January, 2015

Michelle K. Lee
*Deputy Director of the United States Patent and Trademark Office*